(12) United States Patent
Matsutani (10) Patent No.: US 8,085,451 B2
(45) Date of Patent: Dec. 27, 2011

(54) IMAGE READING APPARATUS (75) Inventor: Tetsuro Matsutani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1017 days.

(21) Appl. No.: 11/953,684

(22) Filed: Dec. 10, 2007

(65) Prior Publication Data
US 2008/0137118 A1 Jun. 12, 2008

(30) Foreign Application Priority Data

Dec. 11, 2006 (JP) ................................. 2006-333548

(51) Int. Cl.
H04N 1/46 (2006.01)
(52) U.S. Cl. ........ 358/538; 358/474; 358/497; 358/496; 358/1.9; 382/275; 382/254; 345/620
(58) Field of Classification Search ................. 358/474, 358/497, 1.9, 518, 475, 509, 486, 496, 1.16, 358/538, 1.15; 382/275, 254, 274, 176; 345/620, 345/666
See application file for complete search history.

(56) References Cited

U.S. PATENT DOCUMENTS

| | | | | |
|---|---|---|---|---|
| 5,677,776 | A | | 10/1997 | Matsuda et al. |
| 5,734,758 | A | * | 3/1998 | Yamamoto et al. ............ 382/274 |
| 5,850,298 | A | * | 12/1998 | Narahara et al. .............. 358/518 |
| 6,473,194 | B1 | * | 10/2002 | Sakai ............................ 358/1.17 |
| 7,209,149 | B2 | * | 4/2007 | Jogo ............................... 345/622 |
| 7,218,421 | B2 | * | 5/2007 | Tsuji ............................. 358/3.26 |
| 7,742,194 | B2 | * | 6/2010 | Fujiwara ........................ 358/1.9 |
| 7,860,310 | B2 | * | 12/2010 | Yamamoto .................... 382/173 |
| 2003/0039409 | A1 | * | 2/2003 | Ueda ............................. 382/298 |
| 2003/0053158 | A1 | * | 3/2003 | Tsuji ............................. 358/518 |
| 2004/0057079 | A1 | * | 3/2004 | Ohsawa ......................... 358/2.1 |
| 2006/0176527 | A1 | * | 8/2006 | Kato et al. ..................... 358/505 |
| 2006/0215910 | A1 | * | 9/2006 | Megawa ....................... 382/176 |

FOREIGN PATENT DOCUMENTS

| | | |
|---|---|---|
| JP | H08-154166 A | 6/1996 |
| JP | H11-039463 A | 2/1999 |

(Continued)

OTHER PUBLICATIONS

Japan Patent Office, Notification of Reason for Refusal for Patent Application No. 2006-333548, dated Sep. 14, 2010. (counterpart to above-captioned U.S. patent application).

Primary Examiner — Negussie Worku
(74) Attorney, Agent, or Firm — Baker & Botts L.L.P.

(57) ABSTRACT

An image reading apparatus includes: (i) a capturing device for capturing an original image of a source document; (ii) a moving device for moving one of the capturing device and the source document relative to the other; (iii) a first region processor for causing the moving device to position the capturing device in a first capturing position, so as to obtain a first pixel-related data relating to pixels present in a first region of the source document; (iv) a background-color-basis correcting-value determiner for determining a background-color-basis correcting value, based on the first pixel-related data; and (v) a second region processor for causing the moving device to position the capturing device in a second capturing position, so as to obtain a second pixel-related data relating to pixels present in a second region of the source document. The second region processor is configured to correct the second pixel-related data, based on the background-color-basis correcting value, for reducing influence on the second pixel-related data by a background color of the source document.

10 Claims, 8 Drawing Sheets

FOREIGN PATENT DOCUMENTS

| | | |
|---|---|---|
| JP | 2000-209438 A | 7/2000 |
| JP | 2002-300412 A | 10/2002 |
| JP | 2003-283792 A | 10/2003 |
| JP | 2004-048372 A | 2/2004 |
| JP | 2004-222199 A | 8/2004 |
| JP | 2005-260530 A | 9/2005 |

* cited by examiner

BEFORE BACKGRAUND-CLOR-BASIS
CORRECTION

AFTER BACKGRAUND-CLOR-BASIS
CORRECTION

IMAGE READING APPARATUS

This application claims priority from Japanese Patent Application No. 2006-333548 filed on Dec. 11, 2006, the disclosure of which is herein incorporated by reference in its entirety.

BACKGROUND OF THE INVENTION

1. Field of the Invention

The present invention relates to an image reading apparatus for performing an image reading routine with correction of captured image based on a background color of a source document, and more particularly to such an image reading apparatus that is capable of performing the image reading routine in a reduced length of time.

2. Discussion of Related Art

There is known an image reading apparatus arranged to capture an original image such as character, picture and photograph that is carried on a source document, and to convert the captured image into a digital image data (pixel-related data). Further, as disclosed in JP-H11-39463A, there is proposed a technique of performing a so-called "background-color-basis correction" in such type of image reading apparatus, for avoiding the image data from being influenced by a background color of the source document, particularly, where the background color is non-white color rather than white color.

Figure 8:
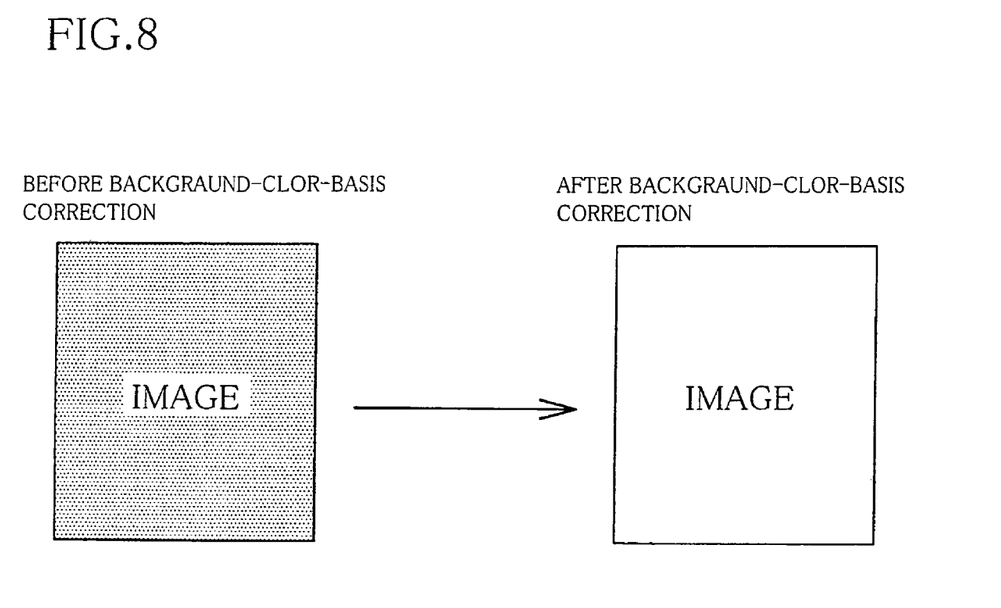
FIG. 8 is a view describing a background-color-basis correction, and schematically showing an original image carried on a source document having a non-white background color and a corrected image obtained by capturing the original image and eliminating the non-white background color from the captured original image by the background-color-basis correction.

FIG. 8 schematically shows an original image of a source document having a non-white background color, and a corrected image obtained by capturing the original image and eliminating the non-white background color from the captured original image. For example, in case of conversion to 16-bit digital data from brightness of each pixel of an image captured from a source document whose background color is white, brightness of the brightest pixel (i.e., brightness of white color) is represented by "FFFF" as the maximum value of 16-bit data while brightness of the darkest pixel (i.e., brightness of black color) is represented by "0000" as the minimum value of 16-bit data. On the other hand, in case of conversion to 16-bit digital data from brightness of each pixel of an image read from a source document whose background color is not white, the above-described "background-color-basis correction" is performed such that brightness of the non-white background color is represented by "FFFF" as the maximum value of 16-bit data.

Specifically, the source document is first subjected to pre-scanning for obtaining brightness of the background color of the source document so as to determine a background-color-basis correcting value based on the obtained brightness of the background color. Then, the same source document is subjected to main scanning for obtaining image data, and the image data is corrected by using the determined background-color-basis correcting value. Thus, it is possible to obtain the image data that is not substantially affected by influence of the background color.

SUMMARY OF THE INVENTION

However, in the above-described conventional technique, the source document has to be subjected to the pre-scanning and main scanning, for determining the background-color-basis correcting value and for obtaining the image data, respectively. That is, the same source document has to be scanned twice, thereby requiring a large length of time for processing the captured image. Where the image reading apparatus is of capturing-device traveling type in which an image reading routine is carried out by moving a capturing device relative to a source document that is fixedly disposed on a document setting table, the capturing device has to be moved from one of opposite end portions of the document to the other of the opposite end portions of the document for performing the pre-scanning for determining the background-color-basis correcting value and then the capturing device has to be returned to the end portion of the document for initiating the main scanning, thereby requiring a large length of time to complete the image reading routine.

Whether the image reading apparatus is of document traveling type in which an image reading routine is carried out by moving a source document relative to a stationary capturing device, the source document has to be moved from a position to another position for performing the pre-scanning for determining the background-color-basis correcting value and then the source document has to be returned to above-described position from the above-described another position, thereby requiring a large length of time to complete the image reading routine.

The present invention was made in view of the background prior art discussed above. It is therefore an object of the invention to provide an image reading apparatus for performing an image reading routine with correction of captured image based on a background color of a source document, in a reduced length of time.

The principle of the invention provides an image reading apparatus including (i) a capturing device operable to capture an original image carried on a source document and (ii) a moving device operable to move at least one of the capturing device and the source document relative to the other in a movement direction, such that an image reading routine is carried out by repeating an capturing operation and a moving operation that are performed by the capturing device and the moving device, respectively. The image reading apparatus further includes: (a) a first region processor configured to cause the moving device to position the capturing device in a first capturing position relative to the source document, so as to obtain a first pixel-related data relating to pixels present in a first region of the source document that is located on a side of one of opposite ends of the source document; (b) a background-color-basis correcting-value determiner configured to determine a background-color-basis correcting value, based on the first pixel-related data; and (c) a second region processor configured, after obtaining of the first pixel-related data, to cause the moving device to position the capturing device in a second capturing position relative to the source document, so as to obtain a second pixel-related data relating to pixels present in a second region of the source document that is located between the first region and the other of the opposite ends of the source document. The second region processor is configured to correct the second pixel-related data, based on the background-color-basis correcting value, for reducing influence on the second pixel-related data by a background color of the source document.

In the image reading apparatus according to the principle of the invention, the first region processor obtains the first pixel-related data relating to the pixels present in the first region of the source document (that is located on a side of one of opposite ends of the source document), and the background-color-basis correcting-value determiner determines the background-color-basis correcting value, based on the first pixel-related data. Then, after the first pixel-related data been obtained by the first region processor, the capturing device is positioned in the second reading position for obtaining the second pixel-related data relating to the pixels present in the second region (that is located between the first region and the other of the opposite ends of the source document). The obtained second pixel-related data is corrected based on the background-color-basis correcting value that is determined by the background-color-basis correcting-value determiner. Thus, this arrangement makes it possible to advantageously reduce a length of time required for completing an image reading routine with the background-color-basis correction, and is advantageous over the conventional arrangement in which a pre-scanning is performed for determining the background-color-basis correcting value and then a main scanning is performed after the source document or the capturing device is returned to an initial position.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
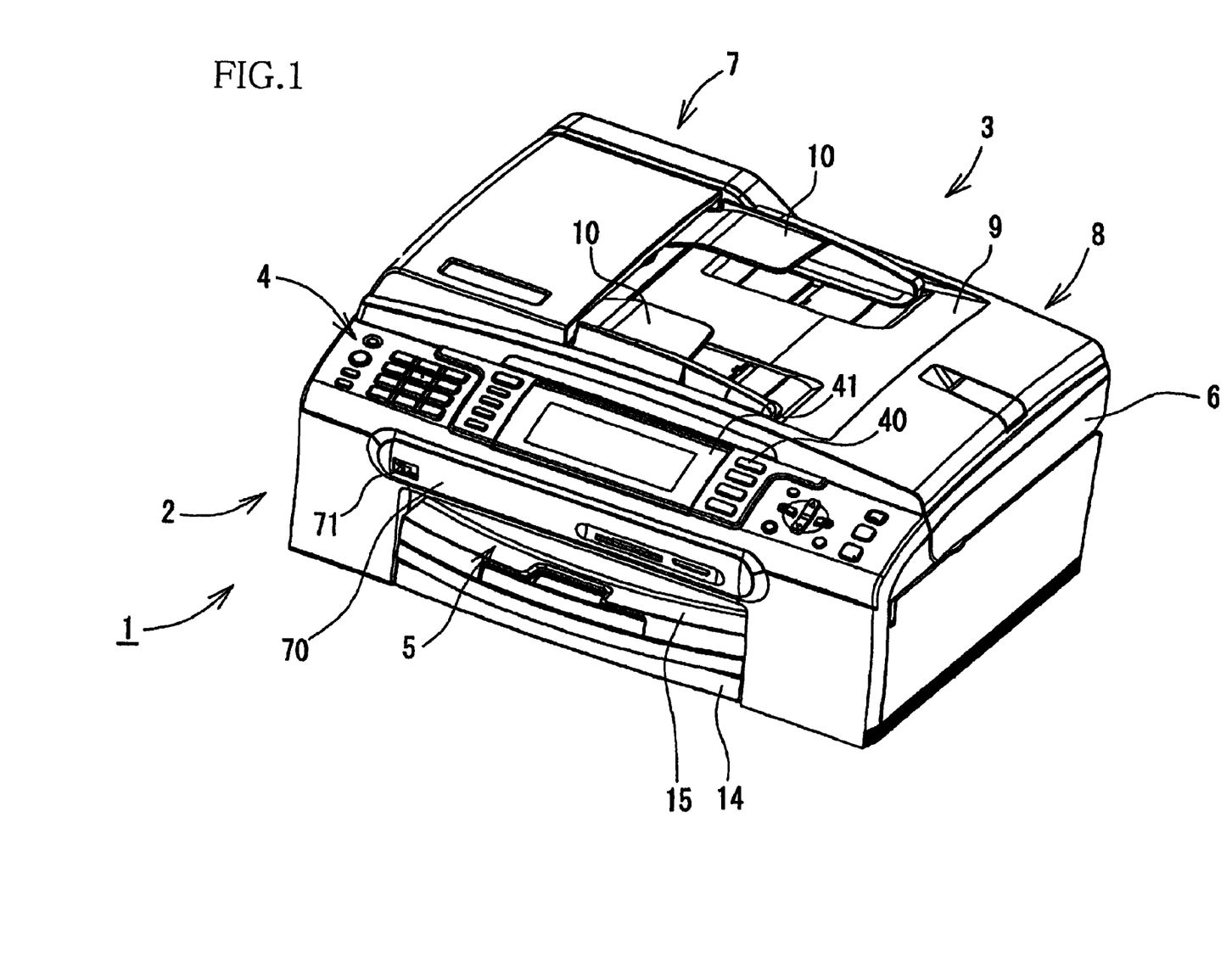
FIG. 1 is a perspective view of a multifunction system as an image reading apparatus, which is constructed according to an embodiment of the invention.

There will be described a preferred embodiment of the present invention, by reference to the accompanying drawings. FIG. 1 is a perspective view of a multifunction system 1 as an image reading apparatus, which is constructed according to the embodiment of the invention. The multifunction system 1 is equipped with various functions such as facsimile, printer, scanner and copier functions.

As shown in FIG. 1, the multifunction system 1 is constituted principally by a printer 2 and a scanner 3 that are operated in response to commands which are inputted through an operator's control panel 4 or which are supplied from an external device connected to the system 1. The printer 2 is provided by a lower portion of a main body of the system 1, while the scanner 3 is provided on an upper side of the printer 2. The operator's control panel 4 is provided on a front side of the scanner 3. It is noted that the printer 2 constitutes an image recording apparatus that is operated to record an image onto a recoding sheet, in accordance with image data (pixel-related data) which is obtained by the scanner 3 or which is supplied from the eternal device.

An opening 5 is provided on a front side of the printer 2, such that a sheet supply tray 14 and a sheet exit tray 15 are completely accommodated in the opening 5. The sheet supply tray 14 and the sheet exit tray 15 are superposed on each other to constitute a double-deck tray assembly such that upper and lower portions of the assembly are provided by the sheet exit tray 15 and the sheet supply tray 14, respectively. The sheet supply tray 14, which is disposed blow the sheet exit tray 15, has a substantially rectangular vessel-like shape and is arranged to accommodate therein rectangular recording sheets that are set with their longitudinal direction being perpendicular to a direction indicated by arrow X in FIGS. 2 and 3.

The printer 2 includes a sheet-feed-path definer defining a generally U-shaped sheet feed path, which extends upwardly from a rear end of the sheet supply tray 14 and then curved to extend forwardly toward a front side of the sheet exit tray 15 that is disposed above the sheet supply tray 14. Each of the recording sheets accommodated in the sheet supply tray 14 is fed along the U-shaped sheet feed path, with one of its short sides serving as a leading end. During feed movement of each recording sheet along the U-shaped sheet feed path, the recording sheet is guided to be positioned in an image recording position, after making U turn. The recording sheet positioned in the image recording position is subjected to an image recording routine performed by the printer 2. The recording sheet, after being subjected to the image recording routine, is discharged to the sheet exit tray 15.

The operator's control panel 4, which is provided by a front portion of the multifunction system 1, has various operation keys 40 (including a key for commanding execution of an image reading routine) and a liquid crystal display (LCD) 41, so that the printer 2 and the scanner 3 are operable by an operator who inputs desired command to the system 1 through the operator's control panel 4. Upon reception of command inputted by the operator, the system 1 performs an operation that is controlled by a CPU 21 (see FIG. 4). It is noted that the system 1 is operable not only in response to the command manually inputted through the operator's control panel 4 but also in response to the command transmitted from the external device (e.g., computer) through a printer driver and a scanner driver that are installed in the computer.

An interface panel 70 is provided on an upper side of the opening 5 that is located on the front side of the printer 2. In a left-side portion of the interface panel 70 (as seen in FIGS. 1 and 2), there is provided a USB terminal 71 for enabling the present multifunction system 1 to be communicable with the external device that is connected to the system 1 via a USB cable.

The scanner 3 serving as the FBS (flat bed scanner) includes: a document setting table 6; a ADF (auto document feeder) 7 that is operable to feed a source document along a document feed path from a document supply tray 9 to a document exit tray 10; and a document cover 8 that incorporates the ADF 7 built therein. The document cover 8 is pivotable relative to the document setting table 6 through hinges 11 (see FIG. 2) that are provided in a rear end portion of the document setting table 6, so that the document cover 8 can be selectively placed in its open and closed positions.

Figure 2:
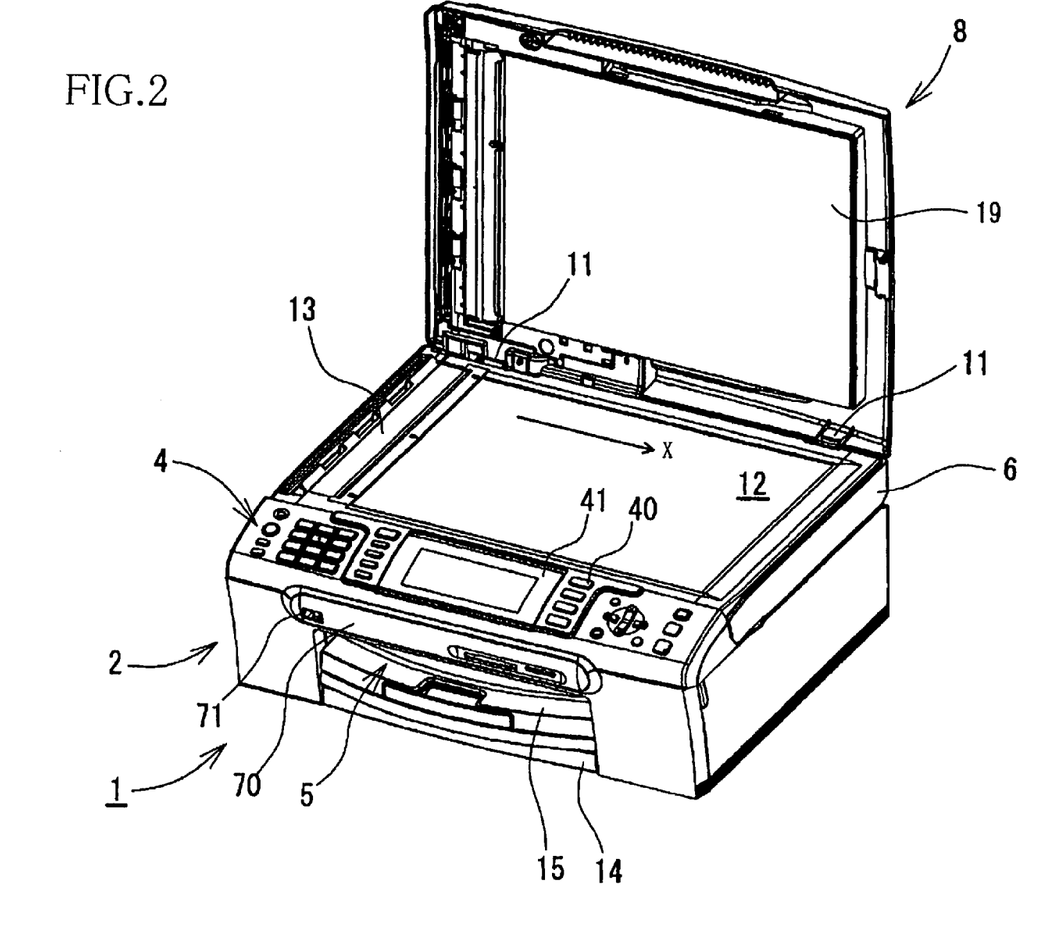
FIG. 2 is a perspective view showing the multifunction system of FIG. 1 when a document cover of the system is placed in its open position.
Figure 3A:
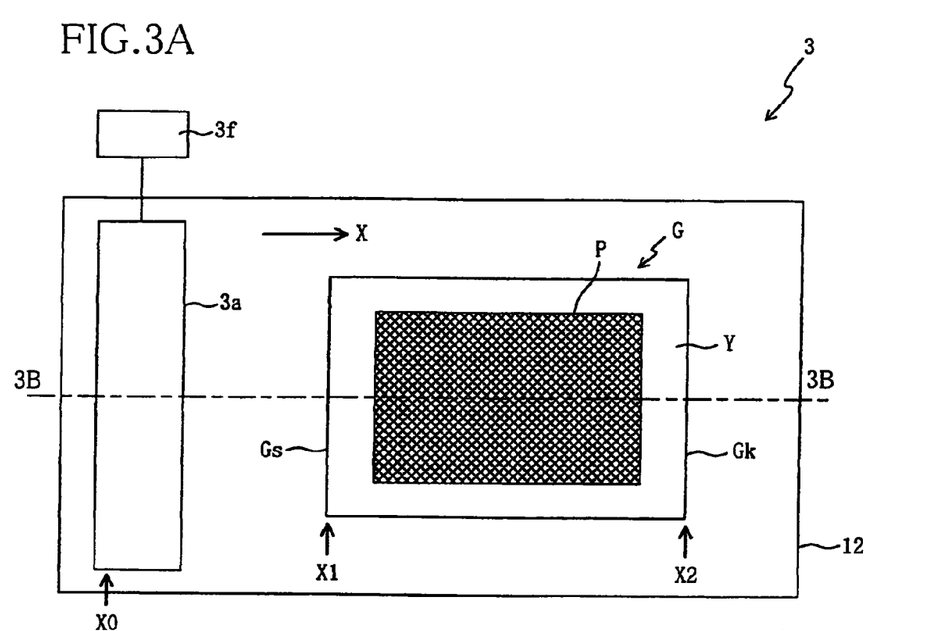
FIG. 3A is a plan view schematically showing a scanner of the system of FIG. 1 and a source document that is positioned relative to the scanner.

FIG. 2 is a perspective view showing the multifunction system 1 of FIG. 1 when the document cover 8 is placed in its open position. As shown in FIG. 2, a document presser 19 is disposed on a bottom surface of the document cover 8. The document presser 19 is provided by a plate-like member in which at least one surface thereof has a white color. The document presser 19 is fixed to the document cover 8 such that the white-colored surface of the document presser 19 faces downwardly. The document setting table 6 has a large opening in which a platen glass 12 is fitted. Inside the document setting table 6, there is a space available for provision of an image capture unit 3a (see FIGS. 3A and 3B) and/or a driver unit 3f. The driver unit 3f serves to support and operate the image capture unit 3a as a capturing device, and also serves as a moving device by which the image capture unit 3a is reciprocatable or movable in bilateral directions that are parallel to the direction indicated by the arrow X (hereinafter referred to as "X direction").

Upon use of the scanner 3 serving as the FBS, the document cover 8 is placed in its open position, and the source document is set on the platen glass 12 that is exposed by placement of the document cover 8 in its open position. The source document is fixed onto the platen glass 12 by placing the document cover 8 in its closed position. In this instance, the source document is fixedly sandwiched between the platen glass 12 and the document presser 19 that is disposed on the bottom surface of the document cover 8. Then, in response to command requesting an image reading routine to be executed, the source document is scanned by the image capture unit 3a that is moved in the X direction (movement direction) along a lower side of the platen glass 12, whereby an original image carried on the source document is captured.

Where the image reading routine is executed with the source document being automatically fed by the ADF 7, the original image is captured, upon passage of the source document through an image reading surface 13 that is provided on the document setting table 6, by the image capture unit 3a that has been moved to be positioned right below the image reading surface 13. The image reading routine is performed with the document setting table 6 being closed by the document cover 8, irrespective of whether it is performed with or without operation of the ADF 7.

Figure 3B:
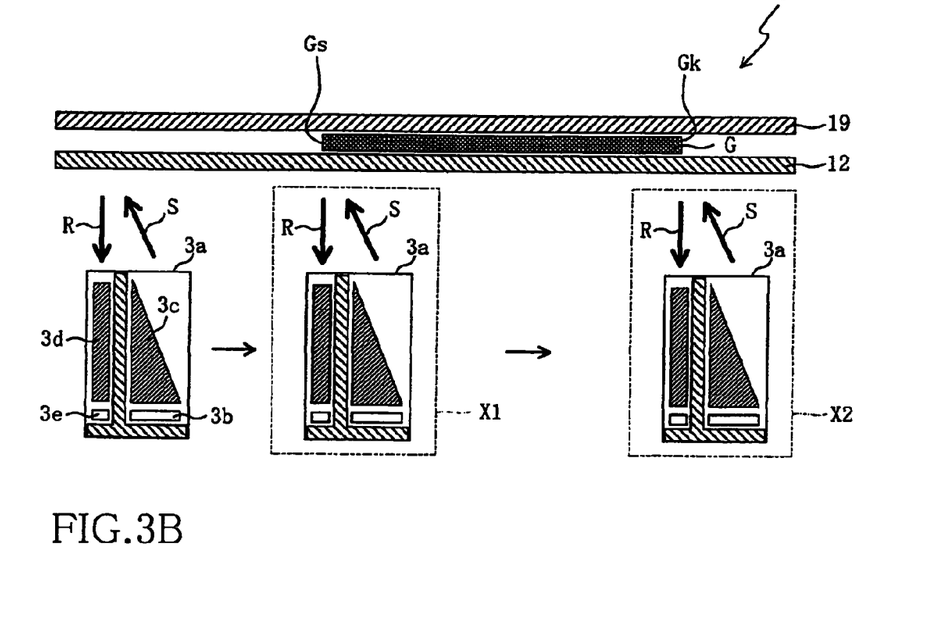
FIG. 3B is a cross sectional view taken along one-dot chain line 3B-3B of FIG. 3A.

There will be next described a basic construction of the scanner 3 by reference to FIGS. 3A and 3B. FIG. 3A is a plan view schematically showing the scanner 3 and the source document that is placed on the platen glass 12. FIG. 3B is a cross sectional view taken along one-dot chain line 3B-3B of FIG. 3A, as seen from a front side of the system 1. As shown in FIGS. 3A and 3B, the image capture unit 3a is disposed below the platen glass 12 that is fitted in the large opening of the document setting table 6. The image capture unit 3a is reciprocatable or movable by the driver unit 3f, in the bilateral directions that are parallel to the X direction.

The source document G contains a non-margin portion and a margin portion Y that surrounds the non-margin portion. An original image P is disposed on the non-margin portion (non-blank portion) while a blank portion is provided by the margin portion, as shown in FIG. 3A. The document G is set on the platen glass 12 such that an image carrying surface (on which the image P is carried) of the document G faces downwardly and such that longitudinally opposite ends of the document G is substantially perpendicular to the X direction. It is noted that there could be some degree of variation with respect to orientation and position of the document G relative to the platen glass 12 since the document G is set on the platen glass 12 manually by the operator. In this sense, the term "longitudinally opposite ends of the document G is substantially perpendicular to the X direction" is interpreted to encompass also a situation in which the longitudinally opposite ends of the document G is slightly inclined with respect to a direction perpendicular to the X direction as a result of manual setting of the document G by the operator who intended to cause the longitudinally opposite ends of the document G to be precisely perpendicular to the X direction, namely, encompass also a situation in which an actual orientation of the set document G is a little deviated from a target orientation of the document G by an amount that corresponds to the possible degree of variation. That is, the term "longitudinally opposite ends of the document G is substantially perpendicular to the X direction" may be interpreted to mean that the longitudinally opposite ends of the document G is almost perpendicular to the X direction.

During execution of the image reading routine, the document G is gripped between the platen glass 12 and the document presser 19 (that is disposed on the bottom surface of the document cover 8 placed in its closed position), so as to be fixed relative to the platen glass 12. Further, during the image reading routine, irrespective of size of the document G, an entirety of scannable area is scanned by the image capture unit 3a. From the thus obtained data, a document presence area in which the document G is present is detected, and the blank portion Y included in the document G is detected.

The image capture unit 3a serving as the capturing device is principally constituted by a light source (LED) 3b, light guides 3c, 3d and a charge-coupled device (CCD) 3e. The LED 3b emits light that is converged by the light guide 3c onto a scanned portion of the source document. The light reflected from the source document is converged by the light guide 3d to the CCD 3e. The CCD 3e serving as an image capturer receives the converged light and then outputs an electric voltage that is dependent on intensity of the received light. The image capture unit 3a is movable by the driver unit 3f in the bilateral directions that are parallel to the direction indicated by the X direction.

In the present embodiment, the LED 3b is first lighted whereby the light is emitted from the LED 3b. The path of the emitted light is changed by the light guide 3c, and the emitted light is irradiated as irradiated light S toward a point that is located right above the CCD 3e. The irradiated light S is reflected as reflected light R by the image carrying surface of the source document G or the white-colored surface of the document presser 19. The reflected light R is condensed by the light guide 3d and is received by the CCD 3e. The CCD 3e outputs the electric voltage whose value is dependent on the intensity of the received light.

The CCD 3e as the image capturer is constituted by a plurality of image capturing elements that are straightly arranged in the direction perpendicular to the X direction. Each one of the image capturing elements is assigned to capture a corresponding one of a set of pixels that are present in one of a plurality of linear regions of the scannable area. After each set of pixels are captured by the CCD 3e, the image capture unit 3a is moved in the X direction by a distance (hereinafter referred to as "one-line distance") corresponding to width of each linear region, so that another set of pixels constituting the next one lineal region are captured by the CCD 3e. By thus repeating a capturing operation and a moving operation that are performed by the image capture unit 3a and the driver unit 3f, the image reading routine is continued until a rear end Gk of the document G is detected.

In the present embodiment, one execution of the capturing operation is completed by causing the image capture unit 3a to capture one set of pixels constituting one of the linear regions each elongated in the direction substantially perpendicular to the X direction, while one execution of the moving operation is completed by causing the driver unit 3f to move the image capture unit 3a by the one-line distance in the X direction. Further, each one of the linear regions corresponds to an elongated region that is elongated in the direction perpendicular to the X direction such that the pixels present in the elongated region are all capturable at a time by the CCD 3e.

The electric voltage value inputted by each of the image capturing elements of the CCD 3e is converted into 16-bit numerical data, and the numeric data is outputted. That is, a value of each pixel captured by a corresponding one of the plurality of image capturing elements of the CCD 3e is represented by 16-bit number, and is outputted. The image capture unit 3a is configured to capture each of the pixels in grayscale. The pixel value outputted as a pixel-related data by the CCD 3e is a value indicative of a level of density that is gradually variable between white and black.

Figure 4:
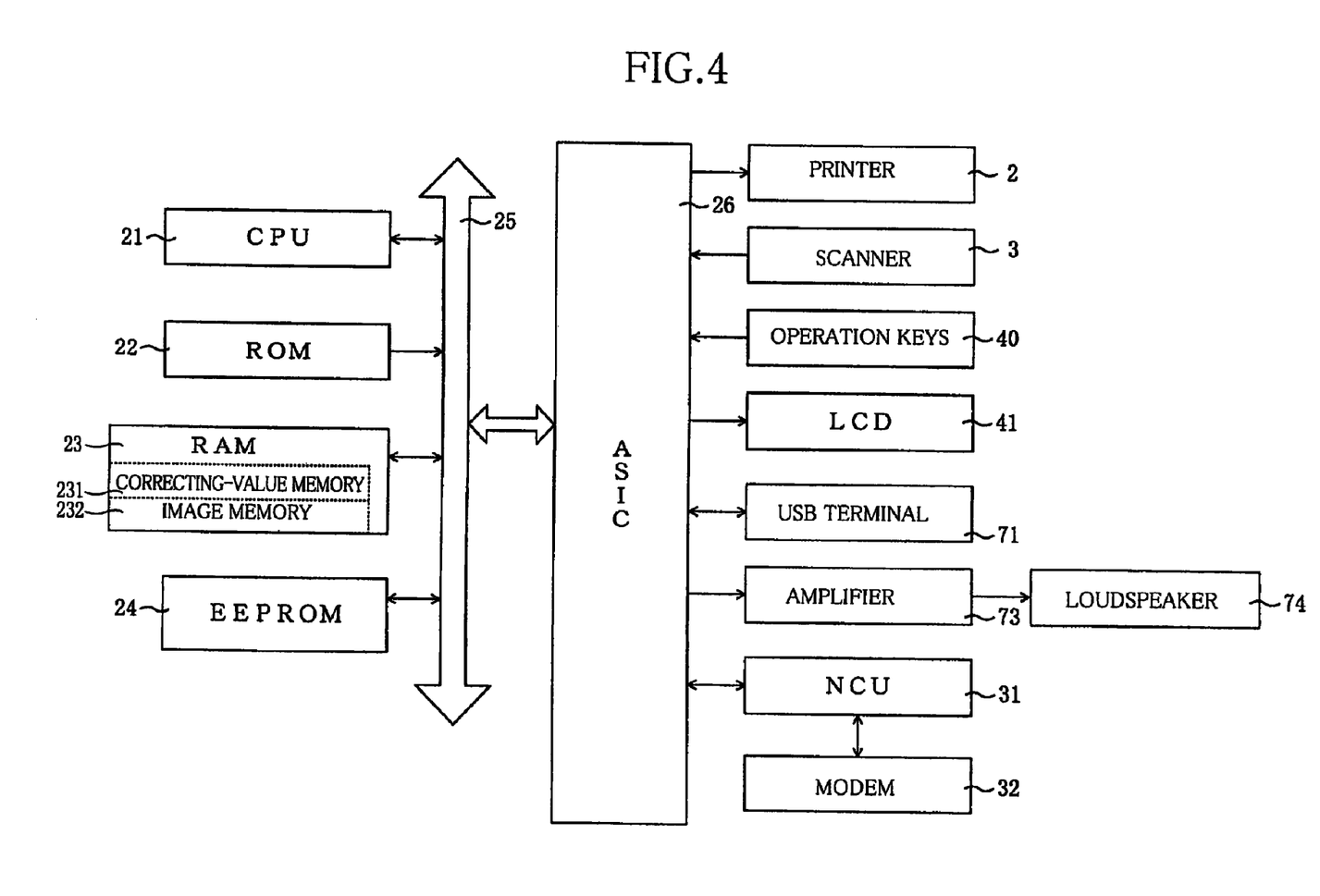
FIG. 4 is a block diagram showing an electrical arrangement in the system of FIG. 1.

The pixel value outputted from the CCD 3e is subjected to a background-color-basis correction, and is then stored into an image memory 232 of a RAM 23 (see FIG. 4). The background-color-basis correction will be described later, by reference to FIG. 5.

The operation keys 40 includes a key for commanding initiation of the image reading routine. When this key is pressed by the operator, the image capture unit 3a is moved to a capturing initiation position (X0) relative to the source document G whereby the image reading routine is initiated. Firstly, the irradiated light S is emitted from the light source 3b of the image capture unit 3a toward a point that is located right above the CCD 3e. Since the document G is not positioned right above the CCD 3e while the image capture unit 3a is positioned in the capturing initiation position (X0), the light reflected by the surface of the document presser 19 (rather than by the surface of the document G) is received by the CCD 3e.

As a result of repeat of the reading and moving operations, the image capture unit 3a reaches a front-end detecting position (X1) which enables the image capture unit 3a to detect a front end Gs of the document G. When the image capture unit 3a reaches the front-end detecting position (X1), the pixel values at the front end Gs of the document G are obtained. Since the irradiated light S is directed left-upwardly (as seen in FIG. 3B), the reflected light R is intensified owing to diffraction of the light taking place at the front end Gs of the document G. Thus, the front end Gs of the document G provides the pixel values indicative of more white than the pixel values provided by the document presser 19, so that it is possible to detect a boundary between the document presser 19 and the document G.

Then, the reading and moving operations are still repeated. When the image capture unit 3a reaches a rear-end detecting position (X2) which enables the image capture unit 3a to detect the rear end Gk of the document G, the pixel values at the rear end Gk of the document G are obtained. Since the irradiated light S is directed left-upwardly (as seen in FIG. 3B), the reflected light R is weakened owing to diffraction of the light taking place at the rear end Gk of the document G. Thus, the rear end Gk of the document G provides the pixel values indicative of more black than the pixel values provided by the document presser 19, so that it is possible to detect a boundary between the document G and the document presser 19.

The pixel-related data obtained by the scanner 3 includes data representative of the image P disposed on the non-margin portion and also data representative of the blank portion Y provided by the margin portion, which will be referred to as "image data" and "blank data", respectively, in the following description. The pixel values of the blank data are substantially the same to one another. Therefore, upon obtaining of the pixel-related data relating to the pixels present in one of the linear regions, it is possible to determine whether the obtained pixel-related data is the blank data by seeing if the pixel values are substantially the same to one another in the obtained pixel-related data.

FIG. 4 is a block diagram showing an electrical arrangement in the system 1 of FIG. 1. The multifunction system 1 is constituted principally by the printer 2, scanner 3, CPU 21, ROM 22, RAM 23, EEPROM 24, ASIC 26, network control unit (NCU) 31, modem 32, operation keys 40, LCD 41, USB terminal 71, amplifier 73 and loudspeaker 74, so that these components are connected to one another via a bus line 25.

The CPU 21 is configured to control parameter values and programs stored in the ROM 22 and the RAM 23, and various functions provided in the system 1, and also to control various portions connected via the bus line 25 in response to various signals transmitted and received via the NCU 31. The ROM 22 is an unwritable memory storage for storing various control programs 22a performed in the system 1. The RAM 23 is a writable memory storage for storing various data, and has a background-color-basis correcting-value memory 231 and the above-described image memory 232. The background-color-basis correcting-value memory 231 is a memory for storing a background-color-basis correcting value that is used in background-color-basis correction of the pixel values that are obtained by the scanner 3. The image memory 232 as a data storage is a memory for storing the pixel-related data obtained by the scanner 3.

The NCU 31 is provided to perform functions such as transmission of dial signals to a telephone network (not shown) and reception of call signals from the telephone network. The modem 32 is provided to modulate and demodulate the pixel-related data via the NCU 31 so as to transmit the pixel-related data to a facsimile device (not shown) and transmit/receive various routine signals for the image transmission. The USB terminal 71 is a known circuit provided for data communication with a computer (not shown) via an USB cable. The amplifier 73 is provided to activate the loudspeaker 74 (that is connected to the amplifier 73) so as to output a ringing tone.

Figure 5:
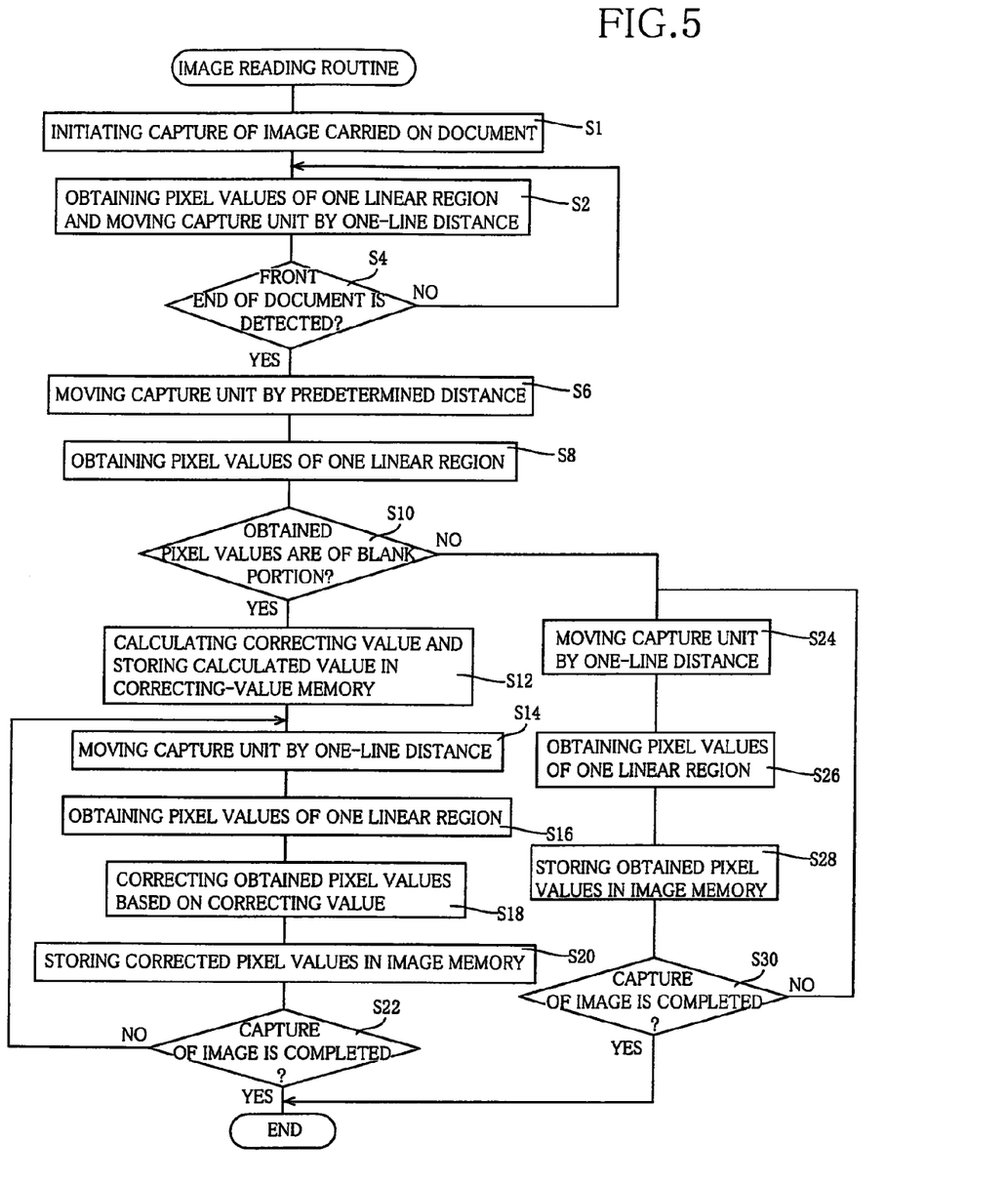
FIG. 5 is a flow chart showing an image reading routine program that is executed in the system of FIG. 1.
Figure 6A:
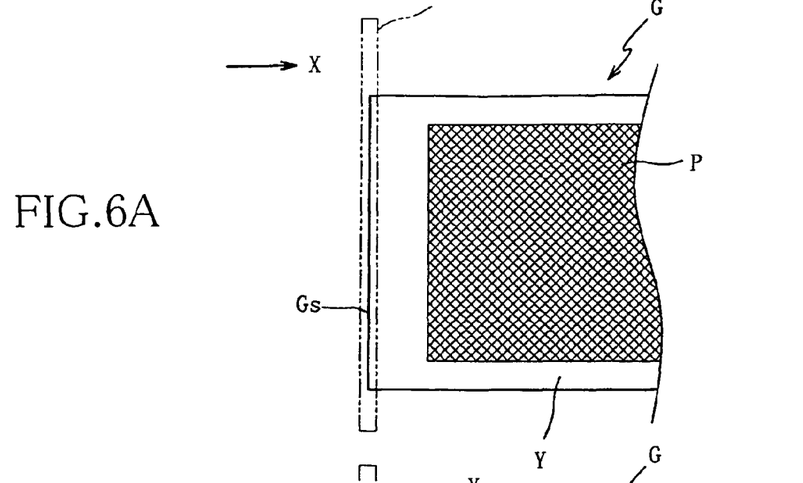
FIGS. 6A-6C is a set of views schematically showing the source document that is subjected to the image reading routine program of FIG. 5.
Figure 6B:
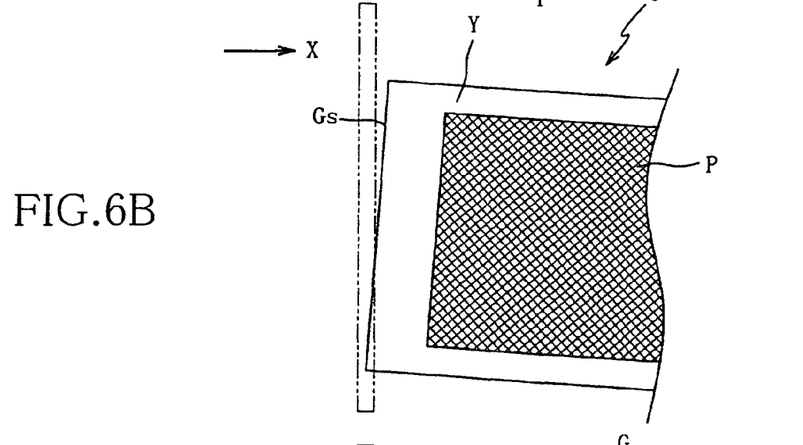
Figure 6C:
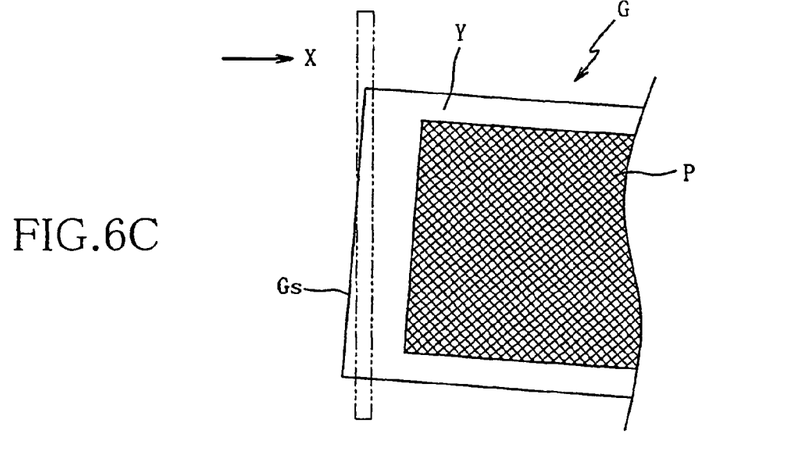

Referring next to FIGS. 5 and 6, there will be next described an image reading routine carried out in the present multifunction system 1. FIG. 5 is a flow chart showing an image reading routine program that is executed in the system 1. FIG. 6 is a set of views schematically showing the source document G is subjected to the image reading routine program of FIG. 5.

When one of the operation keys 40 is pressed by the operator for commanding execution of the image reading routine program, the routine program is initiated with step S1 in which the image capture unit 3a (see FIGS. 3A and 3B) is moved to the capturing initiation position (X0) so as to initiate capture of an original image carried on the source document G. Step S1 is followed by step S2 that is implemented to obtain pixel values of one of the linear regions (i.e., values of pixels present in the one of the linear regions) and to then move the image capture unit 3a in the X direction by the one-line distance. In the subsequent step S4, it is determined whether the front end Gs of the document G is detected or not. While a negative determination (NO) is obtained in step S4, namely, while the front end Gs is not yet detected, the control flow goes back to step S2 for repeating obtaining of the pixel values of a next one of the linear regions and movement of the image capture unit 3a by the one-line distance.

When an affirmative determination (YES) is obtained in step S4, namely, namely, when the front end Gs of the document G is detected, step S6 is implemented to move the image capture unit 3a in the X direction by a predetermined distance (e.g., about 2 to 5 mm). Step S6 is followed by step S8 in which the pixel values of one of the linear regions are obtained by the image capture unit 3a that is positioned in a capturing position as a result of the movement by the predetermined distance.

Where the document G is set on the platen glass 12 with the front end Gs being precisely perpendicular to the X direction as shown in FIG. 6A, the front end Gs of the document G can be entirely covered by one linear region (i.e., a region whose pixels are all capturable at a time by the image capture unit 3a), so that it is possible to scan an entirety of the front end Gs of the document G including widthwise opposite ends of the front end Gs, upon detection of the front end Gs of the document G, namely, while the image capture unit 3a that is positioned in a position of detection of the front end Gs of the document G. In this case, step S4 could be followed by step S8 without implementation of step S6. However, where the front end Gs is not precisely perpendicular to the X direction as shown in FIG. 6B, the entirety of the front end Gs of the document G is not necessarily covered by one linear region so that it is not necessarily possible to scan the entirety of the front end Gs of the document G upon detection of the front end Gs of the document G. Therefore, in the present embodiment, in view of such a possible situation, step S4 is followed by step S6 in which the image capture unit 3a is moved from the position of detection of the front end Gs in the X direction by the predetermined distance, so that both of the widthwise opposite ends of the document G can be reliably scanned by the image capture unit 3a in step S8, as shown in FIG. 6C, even where the front end Gs is somewhat inclined with respect to a direction perpendicular to the X direction. Since the pixel values of one linear region obtained in step S8 are used in calculation the background-color-basis correcting value, it is preferable that the document G is entirely covered in its width direction by the one linear region upon implementation of step S8, for making it possible to appropriately determine the background-color-basis correcting value, based on the pixel values of only the one linear region.

Step S8 is followed by step S10 in which it is determined whether the one linear region scanned in step 8 is included in the blank portion Y of the document G, namely, whether the pixel values of the one linear region obtained in step S8 are of the blank portion Y. This determination is made based on the pixel values of the one linear region, which are substantially the same to one another when the one linear region is included in the blank portion Y since the image P is not disposed on the blank portion Y. It is therefore possible to determine whether the region is included in the blank portion Y or not, for example, by seeing if variation of the pixel values of the region is smaller than a predetermined threshold, although any known method can be employed as a specific method for the determination.

When a negative determination (NO) is obtained in step S10, namely, when the pixel values of the one linear region obtained in step S8 are of the image data rather than of the blank data, the control flow goes to step S24 in which the image capture unit 3a is moved in the X direction by the one-line distance, so that the pixel values of the next one linear region are obtained in the subsequent step S26. Step S26 is followed by step S28 in which the obtained pixel values are stored in the image memory 232 of the RAM 23. In this instance, the obtained pixel values may be subjected to a so-called "shading correction" for adjusting unevenness with respect to the brightness, before the obtained pixel values are stored in the image memory 232. Then, step S30 is implemented to determine whether capture of the image is completed or not. This determination can be made, for example, by seeing if the rear end Gk of the document G is detected or not.

Steps S24 to S30 are repeated until an affirmative determination (YES) is obtained in step S30. Thus, when the pixel values of the one linear region obtained in step S8 are not of the blank data, the obtained pixel values are stored as the pixel-related data into the image memory 232, without the pixel values being subjected to the background-color-basis correction. When the affirmative determination (YES) is obtained in step S30, one cycle of execution of the image reading routine program is completed.

On the other hand, a positive determination (YES) is obtained in step S10, namely, when the pixel values of the one linear region obtained in step S8 are of the blank data rather than the image data, the control flow goes to step S12 in which a background-color-basis correcting value is calculated and the calculated background-color-basis correcting value is stored in the background-color-basis correcting-value memory 231 of the RAM 23. In step S12, specifically described, 16 highest values are sampled from among the pixel values of the one linear region obtained in step S8, and an average of the sampled 16 highest values is calculated. Then, the background-color-basis correcting value is calculated based on the calculated average value and according to expression (1) as given below:

$$\text{(Background-Color-Basis Correcting Value)} = \text{(Maximum Pixel Value)} / \text{(Average of Sampled Pixel Values)} \quad (1)$$

In the above expression (1), "Maximum Pixel Value" is a possible maximum value that can be provided by a bit number representing each pixel value. For example, where each pixel value is represented by 16-bit data, the maximum pixel value is "FFFF" (expressed in hexadecimal number). Further, the above-described sampled 16 highest values are values of 16 brightest pixels, since a higher pixel value indicates more bright (more white) while a lower pixel value indicates more dark (more black).

The background-color-basis correcting value, which is calculated as described above, is stored in the background-color-basis correcting-value memory 231 of the RAM 23 in step S12. As described above, the background-color-basis correcting value can be appropriately calculated, since the one linear region scanned in step S8 is the region that covers the entirety of the source document G in its width direction and also it is determined that the pixel values of the one linear region obtained in step S8 are of the blank data. It is noted that the one linear region scanned in step S8 corresponds to a first region of the source document G.

Step S12 is followed by step S14 in which the image capture unit 3a is moved in the X direction by the one-line distance. Then, step S16 is implemented to obtain the pixel values of the next linear region. Step S16 is followed by step S18 in which each of the pixel values obtained in step S16 is corrected based on the background-color-basis correcting value stored in the background-color-basis correcting-value memory 231. This correction can be made in accordance with, for example, expression (2) as given below:

$$\text{(Corrected Pixel Value)} = \text{(Background-Color-Basis Correcting Value)} \times \text{(Read Pixel Value)} \quad (2)$$

In the subsequent S20, the corrected pixel values are stored as the pixel-related data in the image memory 232. It is noted that the read pixel values may be subjected to the shading correction before the read pixel values are subjected to the background-color-basis correction.

In the present embodiment, as described above, after calculation of the background-color-basis correcting value, only the pixel values of a region, which is closer to the rear end Gk of the document G than the above-described first region scanned in step S8 for calculation of the background-color-basis correcting value, is subjected to the background-color-basis correction. The thus corrected pixel values are stored as the pixel-related data into the image memory 232. On the other hand, the pixel values of the first region obtained in step S8 are not subjected to the background-color-basis correction and are not stored in the image memory 232. However, the exclusion of the pixel values of the first region obtained in step S8 from the pixel-related data (that is to be stored in the image memory 232) data does not cause substantial influence, since the pixel values of the first region used for calculation of the background-color-basis correcting value are of the blank data.

Step S20 is followed by step S22 that is implemented to determine whether capture of the image is completed or not. This determination can be made, for example, by seeing if the rear end Gk of the document G is detected or not. Steps S14 to S22 are repeated until an affirmative determination (YES) is obtained in step S22. Thus, each time the pixel values of one linear region are obtained, the obtained pixel values of the one linear region are subjected to the background-color-basis correction and the corrected pixel values are stored in the image memory 232. In other words, the background-color-basis correction is made each time after obtaining of values of the pixels present in one of a plurality of successive sections, and the corrected pixel values are stored in the image memory 232. This arrangement requires a smaller memory capacity than an arrangement in which the pixel values of each linear region are stored in the image memory 232 and are not subjected to the background-color-basis correction until all of the pixel values of the scannable area are obtained.

When the affirmative determination (YES) is obtained in step S22 as a result of repeated implementations of steps S24 to S30, one cycle of execution of the image reading routine program is completed. It should be noted that the one linear region scanned in step S16 corresponds to a second region of the source document G. Further, in the present embodiment, the above-described CPU 21, ROM 22, RAM 23, EEPROM 24, bus 25 and ASIC 26 cooperate with one another to constitute a controller that includes respective portions each assigned to implement a corresponding one or ones of the above-described steps of the routine program. A portion of the controller assigned to implement steps S6 and S8, a portion of the controller assigned to implement step S12 and a portion of the controller assigned to implement steps S14, S16, S18, S20, S20 constitute a first region processor, a background-color-basis correcting-value determiner and a second region processor, respectively, which are described above in SUMMARY OF THE INVENTION. The second region processor includes a capturing-operation repeater and a background-color-basis corrector. The capturing-operation repeater is constituted by a portion of the controller assigned to implement steps S14, S16. The background-color-basis corrector is constituted by a portion of the controller assigned to implement step S18. The controller further includes a portion which is assigned to implement step S4 and which serves as an end detector configured to detect the front end Gs of the source document G.

In the present multifunction system 1, after the pixel values of the first region are obtained in step S8 for determining the background-color-basis correcting value, the pixel values of the second region that is closer to the rear end Gk of the document G than the first region are obtained and the obtained pixel values of the second region are corrected based on the background-color-basis correcting value. Therefore, even after the background-color-basis correcting value has been determined, the image capture unit 3a may be moved only in the same direction as the movement direction and does not have to be moved in the opposite direction. Further, it is not necessary to newly scan the region that has been already scanned for determination of the background-color-basis correcting value. Thus, the present system 1 is capable of performing the image reading routine with correction of captured image based on the background color of the source document G, in a reduced length of time.

Moreover, in the present multifunction system 1, since the background-color-basis correcting value is determined when the pixel values of the one linear region obtained in step S8 are of the blank data, it is possible to obtain an appropriate value as the background-color-basis correcting value.

In addition, in the present multifunction system 1, since the background-color-basis correcting value is calculated based on the pixel values of one of the linear regions as the first region, the obtaining of the pixel values required for the calculation of the correcting value can be made in a reduced length of time.

While the preferred embodiment of this invention has been described above, it is to be understood that the invention is not limited to the details of the illustrated embodiment, but may be embodied with various changes and modifications, which may occur to those skilled in the art, without departing from the sprit and scope of the present invention.

For example, in the above-described image reading routine program shown in the flow chart of FIG. 5, the pixel values of the first region obtained for calculation of the background-color-basis correcting value are not subjected to the background-color-basis correction, and are discarded rather than being stored into the image memory 232 of the RAM 23. However, the image reading routine program may be modified such that the pixel values of the first region as well as those of the second region may be subjected to the background-color-basis correction and may be stored into the image memory 232. Hereinafter, there will be described such a modification of the image reading routine program.

Figure 7:
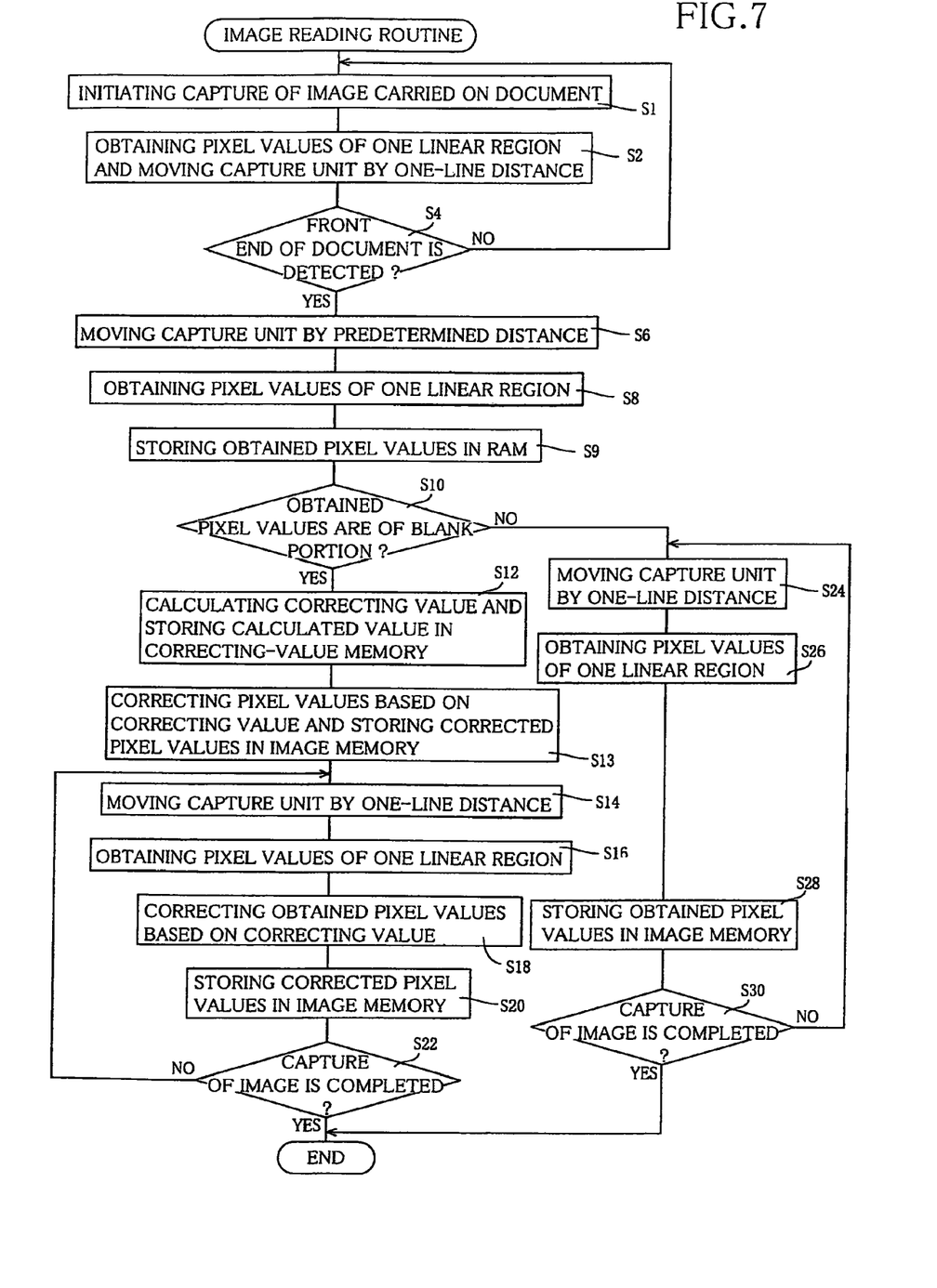
FIG. 7 is a flow chart showing a modification of the image reading routine program of FIG. 5.

FIG. 7 is a flow chart showing the modification of the image reading routine program, which is different from the routine program of FIG. 5 with respect to additional provision of steps S9 and S13. The same reference signs as used in description of the routine program of FIG. 5 will be used to identify the same steps, which will not be described in detail to avoid redundancy of description.

In this modification of the routine program, step S8 is followed by step S9 in which the pixel values of the one linear region obtained in step S8 are stored into the RAM 23 (see FIG. 4). Then, after the background-color-basis correcting value has been calculated in step S12, step S13 is implemented to read the pixel values stored in the RAM 23, correct the pixel values based on the calculated background-color-basis correcting value, and store the corrected pixel values as the pixel-related data in the image memory 232. Then, steps S14 to S22 are repeated until an affirmative determination (YES) is obtained in step S22, like in the routine program of FIG. 5.

According to the modification of the routine program, the pixel values used for calculation of the background-color-basis correcting value are once stored into the RAM 23, then subjected to the background-color-basis correction after calculation of the background-color-basis correcting value, and eventually stored as the pixel-related data into the image memory. Therefore, the pixel values obtained in step S8 can be subjected to the background-color-basis correction, without having to move the image capture unit 3a back in the direction opposite to the X direction.

Further, in the above-described embodiment, the present invention is applied to an operation in which the scanner 3 is used as the FBS, namely, in which the image capture unit 3a is moved relative to the source document G that is disposed in a fixed position, so as to scan the document G. However, the invention is equally applicable to an operation in which scanning of the document G is performed by using the ADF 7 for automatically feeding the document G, namely, in which the image capture unit 3a is positioned in a fixed position and the document G is moved relative to the fixed image capture unit 3a. In this case, the ADF 7 serves as a moving device that is operable to move the document G is moved relative to the image capture unit 3a.

Further, in the above-described embodiment, the image capture unit 3a is configured to capture each pixel in grayscale. However, the invention is equally applicable to a case in which the image capture unit 3a is configured to capture each pixel in color. In this case, RGB value of each pixel outputted by the CCD 3e or brightness calculated from the RGB value corresponds to the pixel-related data.

In the present embodiment, the image reading apparatus is provided by the multifunction system 1 equipped with various functions. However, the image reading apparatus may be provided by other system, apparatus or device, as long as the system, apparatus or device is equipped with a capturing device operable to capture an original image carried on a source document.

What is claimed is:

1. An image reading apparatus comprising (i) a capturing device operable to capture an original image carried on a source document and (ii) a moving device operable to move at least one of said capturing device and the source document relative to the other in a movement direction, such that an image reading routine is carried out by repeating an capturing operation and a moving operation that are performed by said capturing device and said moving device, respectively, said image reading apparatus further comprising a controller that includes:

(a) a first region processing portion configured to cause said moving device to position said capturing device in a first capturing position relative to the source document, so as to obtain a first pixel-related data relating to pixels present in a first region of the source document that is located on a side of one of opposite ends of the source document;

(b) a background-color-basis correcting-value determining portion configured to determine a background-color-basis correcting value, based on the first pixel-related data; and (c) a second region processing portion configured, after the first pixel-related data has been obtained by said first region processing portion, to cause said moving device to position said capturing device in a second capturing position relative to the source document, so as to obtain a second pixel-related data relating to pixels present in a second region of the source document that is located between the first region and the other of the opposite ends of the source document, wherein said second region processing portion is configured to correct the second pixel-related data, for reducing influence on the second pixel-related data by a background color of the source document, such that the second pixel-related data is corrected, by said second region processing portion, based on the background-color-basis correcting determined based on the first pixel-related data that has been obtained by said first region processing portion.

2. The image reading apparatus according to claim 1, wherein said second region processing portion includes: (c-1) a capturing-operation repeater configured to cause said capturing device to repeatedly perform the capturing operation so as to obtain the second pixel-related data relating to the pixels present in each one of a plurality of sections of the second region, and to cause said moving device to move said capturing device relative to the source document, each time after obtaining of the second pixel-related data relating to the pixels present in one of the plurality of sections, so as to enable said capturing device to obtain the second pixel-related data relating to the pixels present in a next one of the plurality of sections that is contiguous to said each one of the plurality of sections; (c-2) a background-color-basis corrector configured, each time after obtaining of the second pixel-related data relating to the pixels present in one of the plurality of sections, to correct the second pixel-related data relating to the pixels present in said each one of the plurality of sections, based on the background-color-basis correcting value that is determined by said background-color-basis correcting-value determining portion; and (c-3) a data storage configured to store therein the second pixel-related data that is corrected by said background-color-basis corrector.

3. The image reading apparatus according to claim 1, further comprising an end detector configured to detect said one of the opposite ends of the source document, wherein said first region processing portion is configured to cause said moving device to position said capturing device in, as said first capturing position, a shifted position that is shifted by a predetermined distance toward said other of the opposite ends of the source document, from an end detecting position in which said one of the opposite ends of the source document is detected, so that the first pixel-related data relating to the pixels present in the first region is obtained with said capturing device being positioned in said shifted position relative to the source document.

4. The image reading apparatus according to claim 1, wherein said capturing device includes an image capturer having a plurality of image capturing elements arranged in a direction that is substantially perpendicular to the movement direction in which said capturing device and the source document are movable relative to each other by said moving device, and wherein said first region processing portion is configured to obtain the first pixel-related data relating to the pixels present in, as the first region, an elongated region that is elongated in the direction substantially perpendicular to the movement direction such that the pixels present in the elongated region are all capturable at a time by said image capturer while said capturing device is being positioned in a position as the first capturing position.

5. The image reading apparatus according to claim 1, wherein said first region processing portion is configured to correct the first pixel-related data relating to the pixels present in the first region, based on the background-color-basis correcting value that is determined by said background-color-basis correcting-value determining portion.

6. The image reading apparatus according to claim 5, wherein said first region processing portion includes a data storage configured to store therein the first pixel-related data that is corrected by said first region processing portion.

7. The image reading apparatus according to claim 1,
wherein said controller is configured to execute a routine including (i) a step of obtaining the first pixel-related data, (ii) a step of determining the background-color-basis correcting value, (iii) a step of obtaining the second pixel-related data, and (iv) a step of correcting the second pixel-related data, based on the background-color-basis correcting value, and wherein execution of the routine by said controller is entirely performed while said capturing device is moved relative to the source document in an unilateral direction as the movement direction, away from the one of the opposite ends of the source document, toward the other of the opposite ends of the source document.

8. An image reading apparatus comprising (i) a capturing device operable to capture an original image carried on a source document and (ii) a moving device operable to move at least one of said capturing device and the source document relative to the other in a movement direction, such that an image reading routine is carried out by repeating an capturing operation and a moving operation that are performed by said capturing device and said moving device, respectively, said image reading apparatus further comprising a controller that includes:
(a) a first region processing portion configured to cause said moving device to position said capturing device in a first capturing position relative to the source document, so as to obtain a first pixel-related data relating to pixels present in a first region of the source document that is located on a side of one of opposite ends of the source document;
(b) a background-color-basis correcting-value determining portion configured to determine a background-color-basis correcting value, based on the first pixel-related data; and
(c) a second region processing portion configured, after the first pixel-related data has been obtained by said first region processing portion, to cause said moving device to position said capturing device in a second capturing position relative to the source document, so as to obtain a second pixel-related data relating to pixels present in a second region of the source document that is located between the first region and the other of the opposite ends of the source document,
wherein said second region processing portion is configured to correct the second pixel-related data, for reducing influence on the second pixel-related data by a background color of the source document, such that the second pixel-related data is corrected, by said second region processing portion, based on the background-color-basis correcting determined based on the first pixel-related data that has been obtained by said first region processing portion,
and wherein said background-color-basis correcting-value determining portion is configured, when the first region of the source document is included in a blank portion of the source document in which the original image is not disposed, to determine the background-color-basis correcting value based on the first pixel-related data relating to the pixels present in the first region.

9. The image reading apparatus according to claim 8, wherein said background-color-basis correcting-value determining portion is configured, when the first region of the source document includes a part of a non-blank portion of the source document in which the original image is disposed, not to determine the background-color-basis correcting value, such that the second pixel-related data is stored in a data storage without the second pixel-related data being corrected based on the background-color-basis correcting value.

10. An image reading apparatus comprising (i) a capturing device operable to capture an original image carried on a source document and (ii) a moving device operable to move at least one of said capturing device and the source document relative to the other in a movement direction, such that an image reading routine is carried out by repeating an capturing operation and a moving operation that are performed by said capturing device and said moving device, respectively, said image reading apparatus further comprising a controller that includes:
(a) a first region processing portion configured to cause said moving device to position said capturing device in a first capturing position relative to the source document, so as to obtain a first pixel-related data relating to pixels present in a first region of the source document that is located on a side of one of opposite ends of the source document;
(b) a background-color-basis correcting-value determining portion configured to determine a background-color-basis correcting value, based on the first pixel-related data and
(c) a second region processing portion configured, after the first pixel-related data has been obtained by said first region processing portion, to cause said moving device to position said capturing device in a second capturing position relative to the source document, so as to obtain a second pixel-related data relating to pixels present in a second region of the source document that is located between the first region and the other of the opposite ends of the source document,
wherein said second region processing portion is configured to correct the second pixel-related data, for reducing influence on the second pixel-related data by a background color of the source document, such that the second pixel-related data is corrected, by said second region processing portion, based on the background-color-basis correcting determined based on the first pixel-related data that has been obtained by said first region processing portion,
and wherein said moving device is configured to move at least one of said capturing device and the source document relative to the other in an unilateral direction as the movement direction after the capturing operation has been performed onto the first region of the source document until the capturing operation has been performed onto said other of the opposite ends of the source document.

* * * * *